US011182801B2

(12) United States Patent
Siwo (10) Patent No.: US 11,182,801 B2
(45) Date of Patent: Nov. 23, 2021

(54) COMPUTER-IMPLEMENTED METHOD AND SYSTEM FOR AUTHENTICATION OF A PRODUCT

(71) Applicant: International Business Machines Corporation, Armonk, NY (US)

(72) Inventor: Geoffrey H Siwo, Sandton (SA)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/832,784

(22) Filed: Dec. 6, 2017

(65) Prior Publication Data

US 2019/0172074 A1    Jun. 6, 2019

(51) Int. Cl.
  *G06Q 30/00*    (2012.01)
  *G06F 16/903*   (2019.01)

(52) U.S. Cl.
  CPC ....... *G06Q 30/0185* (2013.01); *G06F 16/903* (2019.01)

(58) Field of Classification Search
  CPC ................ G06Q 30/0185; G06F 16/903
  See application file for complete search history.

(56) References Cited

U.S. PATENT DOCUMENTS

| 8,527,299 | B2  | 9/2013 | Schmidt |
| 9,031,853 | B2  | 5/2015 | Bartfeld et al. |
| 2009/0098666 | A1* | 4/2009 | Hering ............... H01L 22/14 438/15 |
| 2009/0218401 | A1* | 9/2009 | Moran ............... G06K 5/00 235/439 |
| 2011/0215145 | A1 | 9/2011 | Silverbrook et al. |
| 2013/0332732 | A1 | 12/2013 | Kunin et al. |
| 2015/0195903 | A1* | 7/2015 | Sadasivan ............. B32B 37/025 174/255 |

(Continued)

OTHER PUBLICATIONS

Li, Ling. "Technology designed to combat fakes in the global supply chain." Business Horizons 56.2 (2013): 167-177 (Year: 2013).*

(Continued)

*Primary Examiner* — Gabrielle A McCormick
*Assistant Examiner* — Maame Ofori-Awuah
(74) *Attorney, Agent, or Firm* — Shimon Benjamin; Otterstedt, Wallace & Kammer, LLP (57) ABSTRACT

A computer-implemented method of authenticating a product comprises receiving, from a scanner terminal, a query message including a hapto-signature of the product to be authenticated, the hapto-signature including at least one haptic characteristic of the product as scanned by a touch-sensitive surface of the scanner terminal. The method comprises comparing the received hapto-signature against a hapto-signature database comprising a plurality of reference hapto-signatures, each reference hapto-signature having an associated product, to determine whether or not the received hapto-signature matches at least one of the reference hapto-signatures, wherein a determination that the received hapto-signature matches at least one of the reference hapto-signatures indicates that the product is authentic. The method comprises generating and sending a response message indicative of whether or not the received hapto-signature matches at least one of the reference hapto-signature.

19 Claims, 5 Drawing Sheets

(56) References Cited

U.S. PATENT DOCUMENTS

2015/0310454 A1   10/2015  Ranieri et al.
2016/0267494 A1*  9/2016  Pao ........................ H04W 76/10
2018/0357365 A1* 12/2018  Meadow ................ C40B 40/06

OTHER PUBLICATIONS

Martino et al., "Counterfeit drugs: analytical techniques for their identification", Analytical Bioanalytical Chemistry, Sep. 2010, pp. 77-92, vol. 398, Issue 1.

Degardin et al., "Understanding and fighting the medicine counterfeit market", Journal of Pharmaceutical and Biomedical Analysis, Jan. 18, 2014, pp. 167-175, vol. 87.

* cited by examiner

COMPUTER-IMPLEMENTED METHOD AND SYSTEM FOR AUTHENTICATION OF A PRODUCT

BACKGROUND

The present invention relates to authentication of a product and it relates specifically to a computer-implemented method of authenticating a product using a hapto-signature of the product.

SUMMARY

An example embodiment of the invention provides a computer-implemented method of authenticating a product. The method comprises receiving, from a scanner terminal, via a communication interface of a computer system, a query message including a hapto-signature of the product to be authenticated, the hapto-signature including at least one haptic characteristic of the product as scanned by a touch-sensitive surface of the scanner terminal. The method comprises comparing, by a comparison module of the computer system, the received hapto-signature against a hapto-signature database comprising a plurality of reference hapto-signatures, each reference hapto-signature having an associated product, to determine whether or not the received hapto-signature matches at least one of the reference hapto-signatures, wherein a determination that the received hapto-signature matches at least one of the reference hapto-signatures indicates that the product is authentic. The method comprises generating, by the comparison module, a response message indicative of whether or not the received hapto-signature matches at least one of the reference hapto-signature and sending, via the communication interface, the response message to a designated recipient.

Example embodiments of the invention may also provide a corresponding computer system and a computer program product.

DETAILED DESCRIPTION

An embodiment of the present invention relates to authentication of products by means of a haptic signature or haptic characteristics (referred to as a hapto-signature) of the product. The interaction between a physical material or product and a touch interface depends among other things on the conductance of the material, weight, size and shape. A product can therefore be identified by a combination of these features which form a unique haptic signature or "hapto-signature".

The term "product" may include:
a physical article, material, or substance;
a container of a physical article, material, or substance, such as a bottle, casing, etc.;
a packaging of a physical article, material, or substance, such as a box, a wrapper, or tray;
a tag or token associated with the physical article, material, or substance, the tag or token having at least one haptic characteristic; or
a combination of two or more of these.

A non-limiting example embodiment of the invention is further described with reference to the product being a medical product. However, the scope of this disclosure is not limited to the product necessarily being a medical product. The term "medical product" may include:
a medical composition, such as a medicine, pill, or pharmaceutical;
a container of a medical composition, such as a bottle, vial, blister pack, or sachet;
a packaging of a medical composition, such as a box, a wrapper, or tray;
a tag or token associated with the medical composition, the tag or token having at least one haptic characteristic; or
a combination of two or more of these.

An "authentic product" may indicate that the product is what it purports to be, does what it purports to do, or does indeed originate from its purported origin. Any one or more of a fake product, fraudulent product, counterfeit product, unauthorized product, tampered product, etc. may be considered not to be an authentic product.

Figure 1:
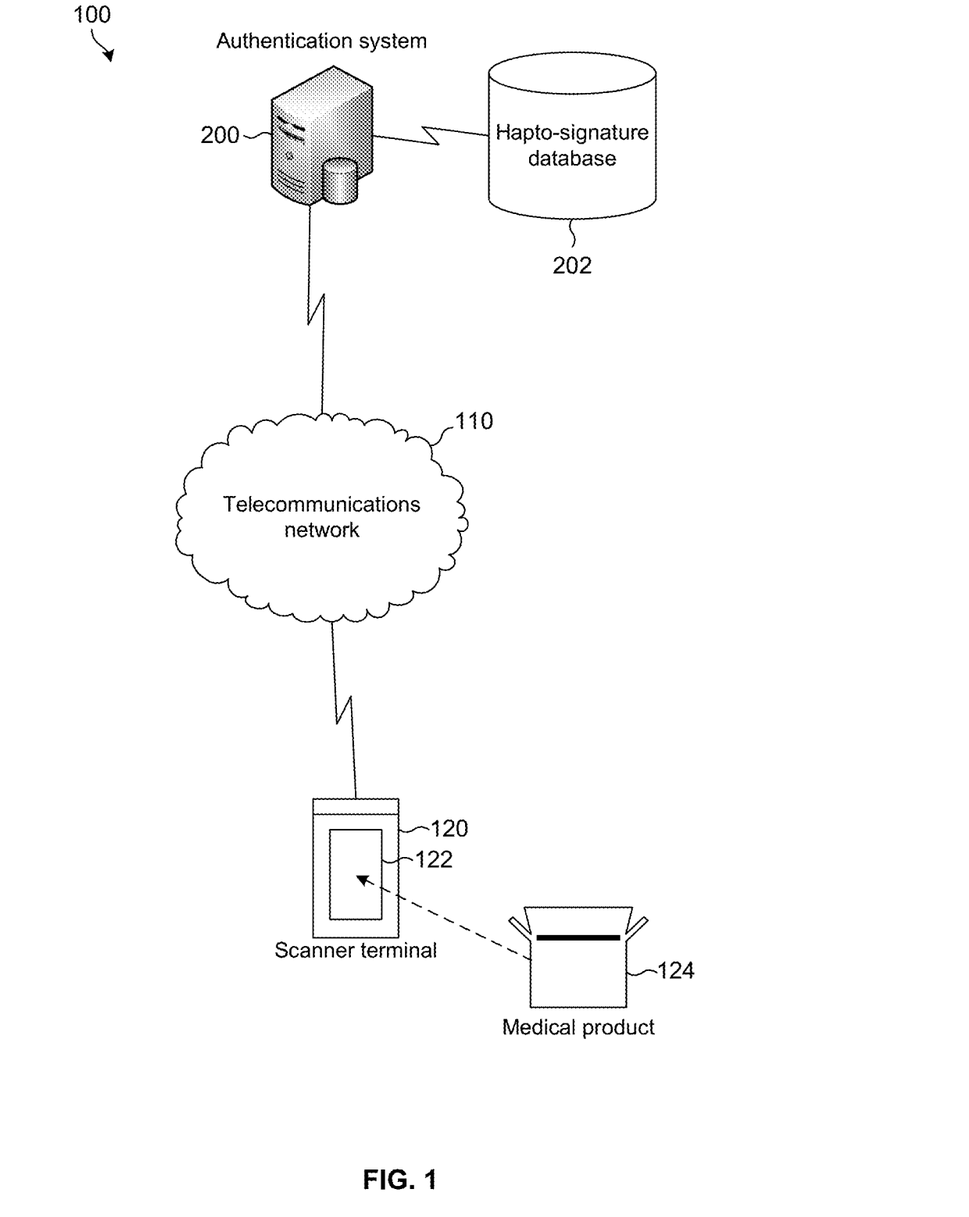
FIG. 1 illustrates a network topology comprising a computer system for authenticating a product, in accordance with an embodiment of the invention.

With reference now to FIG. 1, a network topology 100 includes a computer system 200 for authenticating a medical product 124 using a hapto-signature of the medical product 124, in accordance with an embodiment of the invention. The computer system 200 is described in more detail (below) with reference to FIG. 2 and comprises (either integral therewith or separate and networked thereto) a hapto-signature database 202.

The computer system 200 may be communicatively coupled to a telecommunications network 110 which may be, or at least include, the internet. Accordingly, the computer system 200 may be connectable to remote communication devices. One such communication device to which the computer system 200 is connected is a scanner terminal 120. The scanner terminal 120 includes a touch-sensitive surface 122 which employs one or more touch or haptic technologies to scan an article or product, such as a medical product 124, touching the touch-sensitive surface 122. For example, the medical product 124 may be placed in the touch-sensitive surface 122 merely rest thereon. The scanner terminal 120 may also include a display unit for visually displaying information. The touch-sensitive surface 122 and the display unit may be integrated.

In broad terms, the scanner terminal 120 is operable to scan, using the touch-sensitive surface 122, the medical product 124 thereby to read or scan at least one haptic or touch-based characteristic of the medical product 124 and to generate a hapto-signature of the medical product 124. The hapto-signature comprises the haptic characteristics of the medical product 124.

The scanner terminal 120 has a communication interface and is thereby communicatively coupled via the telecommunications network 110 to the computer system 200. The computer system 200 and the scanner terminal 120 are configured to communicate with each other via the telecommunications network 110 by sending data messages to each other. The scanner terminal 120 may be a conventional touch-sensitive scanner, such as a flatbed scanner, a mobile telephone or tablet with a touch sensitive display, or the like. In one embodiment, the scanner terminal 120 may be a smart phone with a touch-sensitive screen and a suitable software application (an "app") installed thereon to enable the disclosed scanning functionality. Instead, the scanner terminal 120 may not be a conventional device and may be specifically adapted for use with the system 200.

The scanner terminal 120 is configured to generate a query message comprising the hapto-signature and to send the query message via the telecommunications network to the computer system 200 (see further below).

Figure 2:
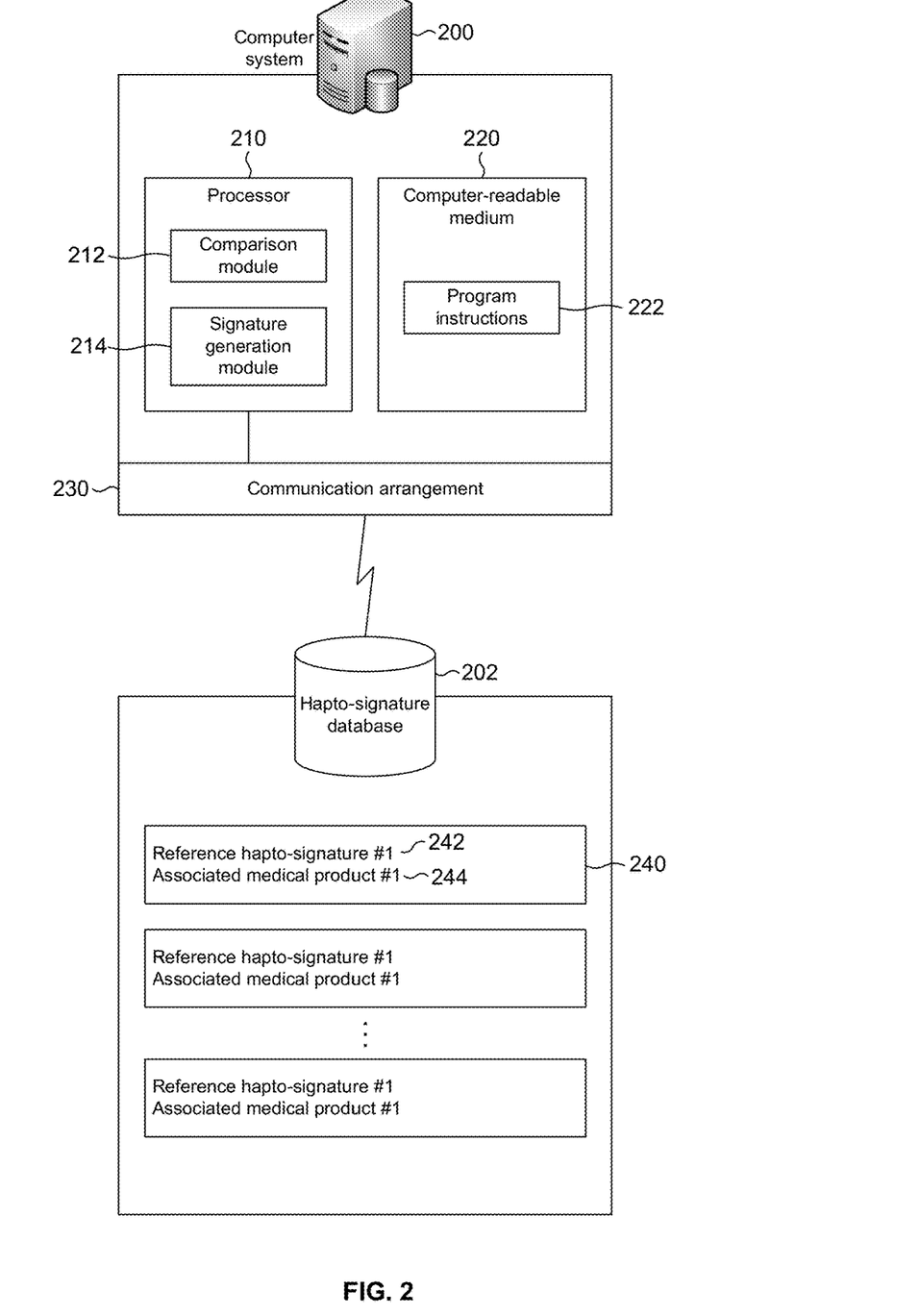
FIG. 2 illustrates a schematic view of the computer system of FIG. 1 in more detail.

FIG. 2 illustrates components of the computer system 200 in more detail. The computer system 200 comprises a computer processor 210 communicatively coupled to a non-transitory computer-readable medium 220. The computer processor 210 may be one or more microprocessors, controllers, or any other suitable computing resource, hardware, software, or embedded logic. Program instructions 222, forming part of a computer program product in accordance with an example embodiment of the invention, are stored on the computer-readable medium 220 and are configured to direct the operation of the processor 210.

The processor 210 (under the direction of the program instructions 222) comprises a plurality of conceptual modules 212, 214 which may correspond to functional tasks performed by the processor 210. The computer system 200 further comprises a communication arrangement 230 which enables communication or networking with other systems, devices, or nodes, either directly or via the intermediate telecommunications network 110. In this example embodiment, the communication arrangement 230 may be a network interface operable to connect the computer system 200 both to the hapto-signature database 202 and to the telecommunications network 110 enabling communication with the scanner terminal 120.

The hapto-signature database 202 comprises a plurality of records 240, each record including a reference hapto-signature 242 and an associated medical product 244 which matches the reference hapto-signature 242.

In broad terms, a comparison module 212 is configured to compare a hapto-signature received from the scanner terminal 120 in a query message against the plurality of reference hapto-signatures 242 stored in the hapto-signature database 202. Accordingly, an example embodiment of the invention may provide an ability to authenticate the medical product 124 based on a unique signature of the medical product 124 caused by interaction with a touch sensitive interface 122.

A signature generation module 214 is configured to generate the plurality of reference hapto-signatures 242, for example using prior reference measurements or using algorithmic or artificial intelligence (AI) learning.

Figure 3:
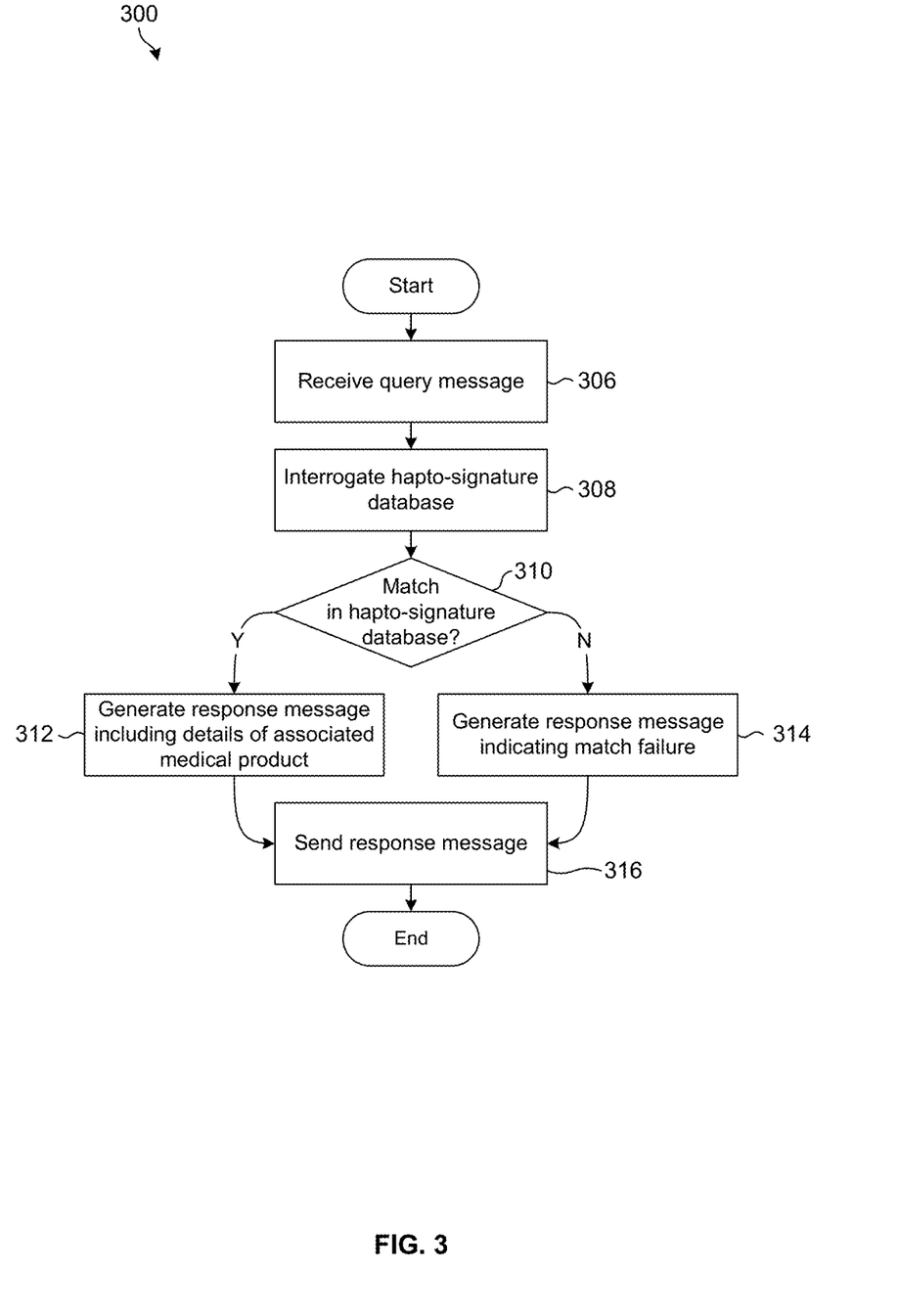
FIG. 3 illustrates a flow diagram of a method authenticating a product, in accordance with an embodiment of the invention, from the perspective of the computer system of FIG. 1.
Figure 4:
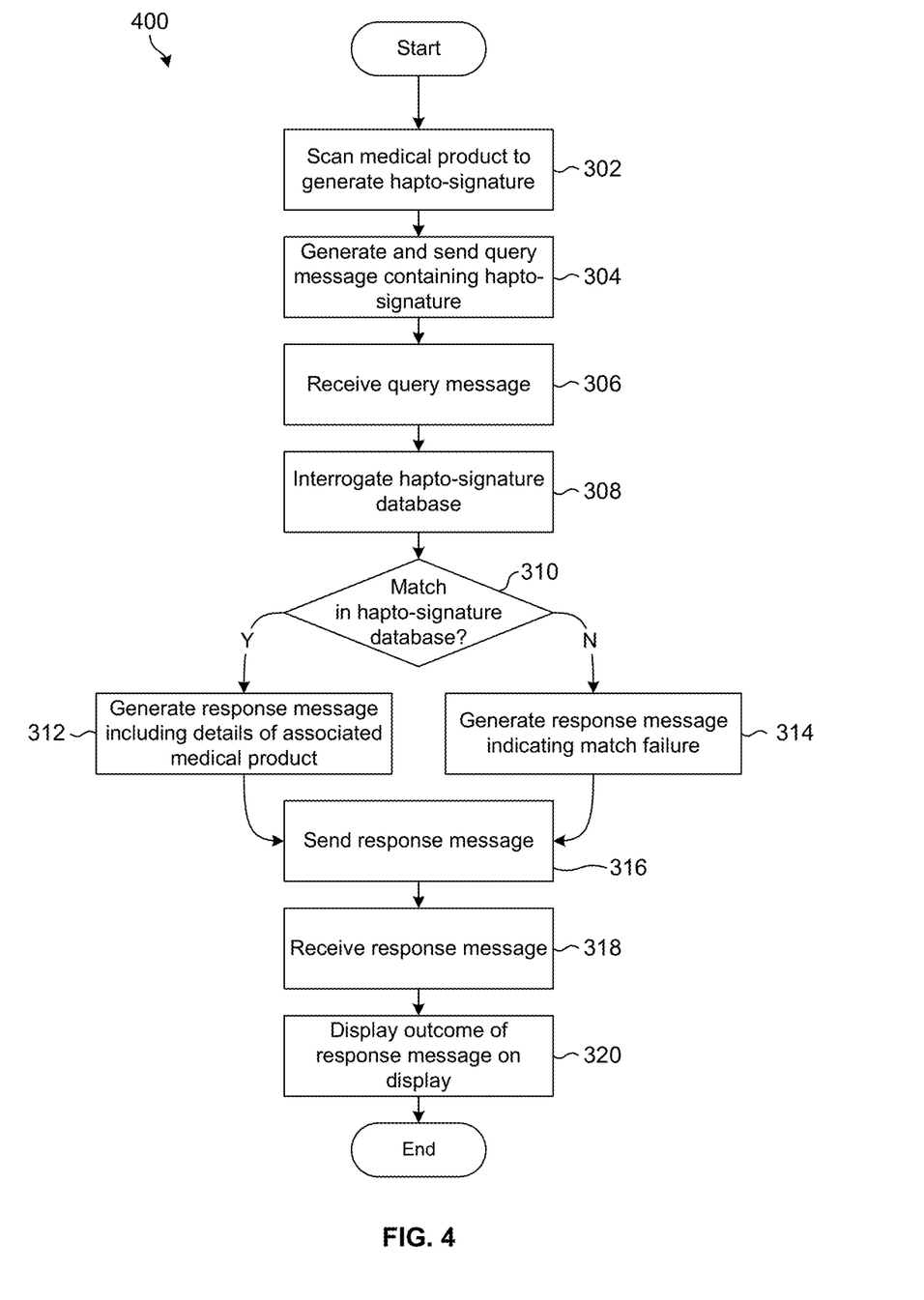
FIG. 4 illustrates a flow diagram of a method including the method of FIG. 4 also from the perspective of a scanner terminal.
Figure 5:
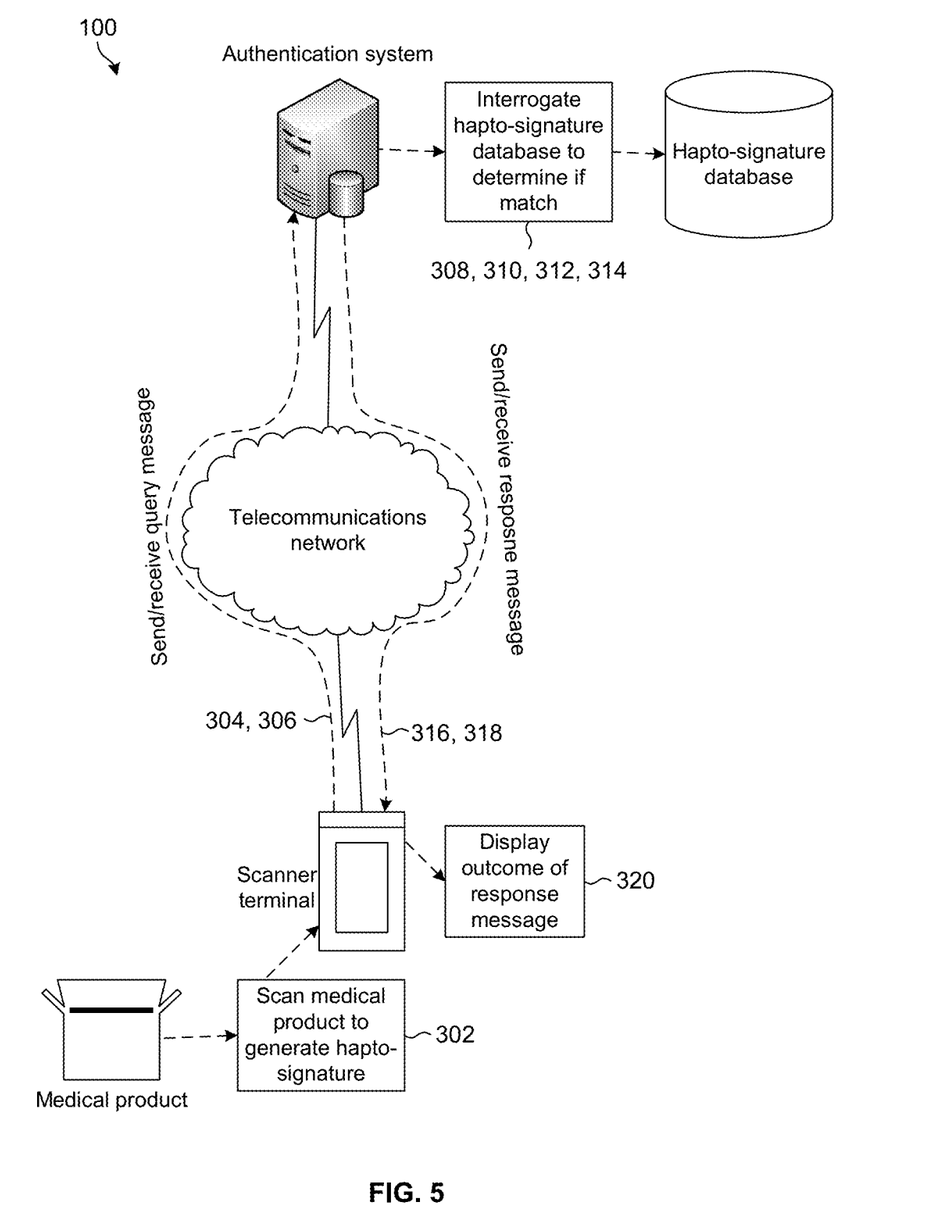
FIG. 5 illustrates the network topology of FIG. 1 including the method of FIG. 4.

An example embodiment of the invention will be further described in use, with reference to FIGS. 3-5. FIG. 3 illustrates a functional block diagram of a method 300 of authenticating a medical product, in accordance with an embodiment of the invention, from the perspective of the computer system 200. FIG. 4 illustrates a method 400 incorporating the method 300 but also including steps actioned by the scanner terminal 120. FIG. 5 illustrates the network topology 100 including the messages and processing of the method 400 of FIG. 4.

Although the computer system 200 is illustrated with reference to the methods 300, 400, it will be appreciated that the computer system 200 may be configured to implement a different method, and that the methods 300, 400 may be implemented by a different system.

In use, a user may have a medical product 124 which they wish to authenticate. The user may be a manufacturer, merchant, pharmacist, consumer, patient, or the like. The method 300 may be made accessible to any user, or merely to authorized users. The user begins by contacting the medical product 124 with the touch-sensitive surface 122, e.g., by placing the medical product 124 atop the touch-sensitive surface 122.

Any physical material or article, when interacting with an electronic touch-sensitive surface, creates a unique or identifiable interaction. The interaction between the physical material and a touch interface depends on various characteristics including conductance, weight, size and shape of the material. When the material is the medical product 124, the scanner terminal 120 scans or measures (at block 302) at least one of these characteristics and generates a hapto-signature indicative of the measured at least one characteristic.

In an example embodiment of the invention, the scanner terminal 120 may be configured to measure the haptic characteristics of the medical product 124 instantaneously or impulsively. In another example embodiment, the scanner terminal 120 may be configured to measure the haptic characteristics of the medical product 124 over a period of time (which may be relatively short, e.g., 5-10 seconds) thereby to measure haptic characteristics over time or to measure a change in haptic characteristics over time.

The scanner terminal 120 may be configured to measure a signal intensity induced along a perimeter of the medical product 124 while it contacts the touch-sensitive surface 122, where the signal intensity may comprise change in capacitance, conductance, resistance, opacity, light absorbance or reflectance. The scanner terminal 120 may be configured to measure boundaries of a shift in capacitance of the touch-sensitive surface 122 (e.g., being a capacitive touch-sensitive surface), or a shift in resistance for the touch-sensitive surface 122 (e.g., being a resistive touch-sensitive surface) or a shift in light dispersion of the touch-sensitive surface 122 (e.g., being an infrared or light based touch-sensitive surface).

The scanner terminal 120 may be configured to measure a contact surface size of the medical product 124 based on a signal intensity across an area occupied by the medical product 124 on the touch-sensitive surface 122. The scanner terminal 120 may be configured to measure a weight of the medical product 124 based on one or more of the following features of its effect on the touch-sensitive surface 122: signal intensity along the perimeter of the medical product 124 or signal intensity across an area occupied by the medical product 124. A predefined region on the touch-sensitive surface 122 may be used which has the same shape, perimeter, boundaries, or surface area as the medical product.

The scanner terminal 120 may be configured to construct the hapto-signature of the medical product 124 by combining elements of the examples mentioned above to obtain a mathematical vector having elements representing a specific kind of signal intensity along the perimeter or across the area or in a pre-defined region of the medical product 124 on the touch-sensitive surface 122. In a different example embodiment, the mathematical vector or other output may be calculated by the computer system 200 from the elements received from the scanner terminal 120 in the hapto-signature of the query message.

Once the hapto-signature has been created by the scanner terminal 120, it generates a query message comprising the hapto-signature and then sends (at block 304) the query message to the computer system 200 via the telecommunications network 110. Accordingly, the computer system 200 receives (at block 306) the query message.

The comparison module 212 is configured to resolve the hapto-signature from the query message and to interrogate (at block 308) the hapto-signature database 202 in order to establish (at block 310) whether or not the received hapto-signature matches one of the reference hapto-signatures 224.

Depending on the specific configuration of the comparison module 212, the matching may be implemented in various ways. In one embodiment, the matching process may be a straightforward comparison to establish whether or not the received hapto-signature is identical to one of the reference hapto-signatures 242. In another embodiment, the comparison module 212 is configured to determine that the received hapto-signature matches one of the reference hapto-signatures 242 if it is not necessarily identical but nonetheless within a pre-defined tolerance of at least one of the reference hapto-signatures 242 or is within a pre-defined statistical similarity of at least one of the reference hapto-signatures 242. For example, a statistical similarity may be calculated using correlation and mutual information.

The comparison module 212 generates (at block 312, 314) a response message. If a matching reference hapto-signature 242 was found (at block 312), the response message may include confirmation of a match only, or confirmation of a match together with an indication of the associated medical product 244. If no matching reference hapto-signature 242 was found (at block 314), the response message merely includes confirmation of no match.

The computer system 200 sends (at block 316) the response message. In an example embodiment of the invention, the scanner terminal 120 is a designated recipient and the response message is sent back to the scanner terminal 120 from which the query message was received. Accordingly, the scanner terminal 120 receives (at block 318) the response message. The scanner terminal 120 may display (at block 320) details of the response message, including whether or not a match was found and accordingly whether or not the medical product 124 is authentic. The display unit may also display details of the associated medical product (if contained in the response message) so that the user can be sure which reference hapto-signature 242 was matched.

Instead, or in addition, the response message may be sent to a designated recipient other than the scanner terminal 120. For example, the response message may be sent to a mobile phone or work terminal of a user associated with the scanner terminal 120.

As mentioned above, the medical product 124 may be a medical composition itself, or may be a tag associated with the medical product. In an embodiment of the invention, the packaging of the medical product may be a physical tag with identifying haptic characteristics attached thereto, embedded therein, or otherwise linked therewith. With this in mind, the tag may be specifically designed for use with the computer system 200. The signature generation module 214 may be configured to generate tags, or aspects of tags, to have an identifiable and predictable hapto-signature. Instead, or in addition, the signature generation module 214 may be configured to generate reference hapto-signatures 242 from a description of the medical product 124.

For example, the signature generation module 214 may be configured to predict hapto-signatures for tags of known shape, size, conductance, resistance, porosity, absorbance, and/or reflectance based on statistical or machine learning models trained on a range of reference hapto-signatures for medical tags of known shape, size, conductance, resistance, porosity, absorbance, and/or reflectance.

The signature generation module 214 may be configured to design an optimal shape, size, weight, conductance or resistance, porosity, absorbance, reflectance for a tag to have a unique hapto-signature based on statistical or machine learning models trained on a range of reference hapto-signatures for tags of known shape, size, conductance, resistance, porosity, absorbance, reflectance, such a tag then being associated with a packaging or medical composition thereby to constitute the medical product 124. The signature generation module 214 may be configured to encode product information such as but not limited to manufacturing date, batch number onto a hapto-signature and generating a tag based on the encoding.

Further, the container or packaging of the medicine, pharmaceutical, etc. may be specifically modified to have an identifiable hapto-signature. For example, this modification may include functionalizing or doping or alloying the container, packaging, and/or tag, with material that has a unique hapto-signature.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Advantages of example embodiments of the present invention may limit or eliminate counterfeit products (e.g., medical products) which cause huge economic losses. In addition, counterfeit medical products can result in non-treatment of disease or even death, example embodiments of the present invention assisting in ensuring that authentic medication reaches the patient.

What is claimed is:

1. A computer-implemented method of authenticating a product, the method comprising: designing, by a signature generation module of the computer system, an optimal resistance for the product to have a unique hapto-signature based on one or more machine learning models trained on a range of training reference hapto-signatures for associated products of known shape, size, and resistance; receiving, from a scanner terminal, via a communication interface of a computer system, a query message including a hapto-signature of the product to be authenticated, the hapto-signature including at least one haptic characteristic of the product as scanned by a touch-sensitive surface of the scanner terminal, wherein the at least one haptic characteristic comprises a signal intensity along a perimeter of the product relative to the touch-sensitive surface; comparing, by a comparison module of the computer system, the received signal intensity along the perimeter of the product against a hapto-signature database comprising a plurality of reference hapto-signatures, each reference hapto-signature having an associated product, to determine whether or not the received signal intensity matches at least one of the reference hapto-signatures, wherein a determination that the received signal intensity matches at least one of the reference hapto-signatures indicates that the product is authentic; generating, by the comparison module, a response message indicative of whether or not the received signal intensity matches at least one of the reference hapto-signatures; and sending, via the communication interface, the response message to a designated recipient.

2. The method of claim 1, wherein determining whether or not the received signal intensity matches at least one of the reference hapto-signatures includes at least one of: determining that the scanned hapto-signature matches at least one of the reference hapto-signatures if the received signal, intensity is identical to at least one of the reference hapto-signatures; determining that the scanned hapto-signature matches at least one of the reference hapto-signatures if the received signal intensity is within a pre-defined tolerance of at least one of the reference hapto-signatures; or determining that the scanned hapto-signature matches at least one of the reference hapto-signatures if the received signal intensity is within a pre-defined statistical similarity of at least one of the reference hapto-signatures.

3. The method of claim 1, wherein: the query message includes an identifier of the product other than the hapto-signature in the received query message, and the hapto-signature in the received query message is compared against only the reference hapto-signature of the identified product; or the query message does not include an identifier of the product other than the received hapto-signature, and the hapto-signature in the received query message is compared against all of the reference hapto-signatures of the hapto-signature database.

4. The method of claim 1, wherein, in response to a determination that the received signal intensity matches at least one of the reference hapto-signatures, generating the response message comprises including in the response message an indication of the associated product of the matching reference hapto-signature.

5. The method of claim 1, further comprising: scanning, by the touch-sensitive surface of the scanner terminal, the product to be authenticated; generating, by the scanner terminal, the hapto-signature of the scanned product; and generating and sending, by the scanner terminal to the computer system, the query message including the generated hapto-signature of the product to be authenticated.

6. The method of claim 1, wherein the designated recipient is the scanner terminal and wherein the method further comprises: receiving, by the scanner terminal, the response message; and displaying, by the scanner terminal, the determination of whether or not the product is authentic.

7. The method of claim 6, further comprising displaying, in response to a determination that the received signal intensity matches at least one of the reference hapto-signatures, an indication of the associated product of the matching reference hapto-signature.

8. The method of claim 1, wherein the hapto-signature of the product to be authenticated comprises at least one of the following characteristics or a change or shift in at least one of the following characteristics of the product:
   capacitance; conductance; resistance; opacity; light absorbance; and/or reflectance.

9. The method of claim 1, wherein the hapto-signature includes data related to the product encoded therein.

10. The method of claim 1, further comprising predicting, by a signature generation module of the computer system, a reference hapto-signature for an associated product of known shape, size, conductance, resistance, porosity, absorbance, and/or reflectance based on statistical or machine learning models trained on a range of reference hapto-signatures for products of known shape, size, conductance, resistance, porosity, absorbance, and/or reflectance.

11. The method of claim 1, further comprising designing, by the signature generation module of the computer system, an optimal shape, size, weight, conductance, porosity, absorbance, and/or reflectance for the product to have a second unique hapto-signature based on statistical or machine learning models trained on a second range of reference hapto-signatures for associated products of known shape, size, conductance, porosity, absorbance, and/or reflectance.

12. The method of claim 1, wherein the product is a medication, further comprising administering the medication to a patient in response to the received signal intensity matching at least one of the reference hapto-signatures.

13. A computer system for authenticating a product, the system comprising: a computer processor; a hapto-signature database comprising a plurality of reference hapto-signatures, each reference hapto-signature associated with a product; a communication interface operable to send and receive messages; and a computer readable storage medium having stored thereon program instructions executable by the computer processor to direct the operation of the processor, wherein the computer processor, when executing the program instructions, comprises: a signature generation module configured to design an optimal resistance for the product to have a unique hapto-signature based on one, or more machine learning Models trained on a range of training reference hapto-signatures for associated products of known shape, size, and resistance; and a comparison module configured to compare a hapto-signature included in a query message received from a scanner terminal via the communication arrangement, wherein the scanner terminal comprises a touch-sensitive surface, wherein the hapto-signature comprises at least one haptic characteristic, wherein the at least one haptic characteristic comprises a signal intensity along a perimeter of the product relative to the touch-sensitive surface, wherein the received signal intensity is compared to the plurality of reference hapto-signatures, to determine whether or not the received signal intensity matches at least one of the reference hapto-signatures, wherein a determination that the received signal intensity matches at least one of the reference hapto-signatures indicates that the product is authentic, wherein the comparison module is further configured to generate a response message indicative of whether or not the received signal intensity matches at least one of the reference hapto-signatures, and wherein the comparison module is further configured to send, via the communication interface, the response message to a designated recipient.

14. The system of claim 13, wherein the comparison module is configured to determine whether or not the received signal intensity matches at least one of the reference hapto-signatures based, on at least one of: determining that the scanned hapto-signature matches at least one of the reference hapto-signatures if the received signal intensity is identical to at least one of the reference hapto-signatures; determining that the scanned hapto-signature matches at least one of the reference hapto-signatures if the received signal intensity is within a pre-defined tolerance of at least one of the reference hapto-signatures; or determining that the scanned hapto-signature matches at least one of the reference hapto-signatures if the received signal intensity is within a pre-defined statistical similarity of at least one of the reference hapto-signatures.

15. The system of claim 13, wherein the comparison module is further configured, in response to a determination that the received signal intensity, matches at least one of the reference hapto-signatures, to generate the response message by including in the response message an indication of the associated product of the matching reference hapto-signature.

16. The system of claim 13, wherein the touch-sensitive surface is operable to scan the product to be authenticated.

17. The system of claim 16, wherein: the scanner terminal is the designated recipient; and the scanner terminal comprises a display unit configured to display the determination of whether or not the product is authentic.

18. The system of claim 13, wherein the signature generation module is configured to: generate at least one of the reference hapto-signatures by predicting reference hapto-signatures for products of known shape, size, conductance, porosity, absorbance, and/or reflectance, based on statistical or machine learning models trained on a second range of reference hapto-signatures for associated products of known shape, size, conductance, resistance, porosity, absorbance, and/or reflectance; or design an optimal shape, size, weight, conductance, porosity, absorbance, and/or reflectance for the product to have a second unique hapto-signature based on statistical or machine learning models trained on the second range of reference hapto-signatures for associated products of known shape, size, conductance, resistance, porosity, absorbance, and/or reflectance.

19. A computer program product for authenticating a product, the computer program product comprising: a computer-readable medium having stored thereon: first program instructions executable by a computer processor to cause the computer processor to receive, from a scanner terminal, a query message including a hapto-signature of the product to be authenticated, the hapto-signature including at least one haptic characteristic of the product as scanned by a touch-sensitive surface of the scanner terminal, wherein the at least one haptic characteristic comprises a change or shift in at least one of the following characteristics of the product: capacitance, conductance, and resistance; second program instructions executable by the computer processor to cause the computer processor to compare the received hapto-signature against a hapto-signature database comprising a plurality of reference hapto-signatures, each reference hapto-signature having an associated product, to determine whether or not the received hapto-signature matches at least one of the reference hapto-signatures, wherein a determination that the received hapto-signature matches at least one of the reference hapto-signatures indicates that the product is authentic; third program instructions executable by the computer processor to cause the computer processor to generate a response message indicative of whether or not the received hapto-signature matches at least one of the reference hapto-signature; fourth program instructions executable by the computer processor to cause the computer processor to send the response message to a designated recipient; and fifth program instructions executable by the computer processor to cause the computer processor to design, by a signature generation module of the computer system, an optimal resistance for the product to have a unique hapto-signature based on machine learning models trained on a range of reference hapto-signatures for associated products of known shape, size, and resistance.

* * * * *